UNITED STATES PATENT OFFICE.

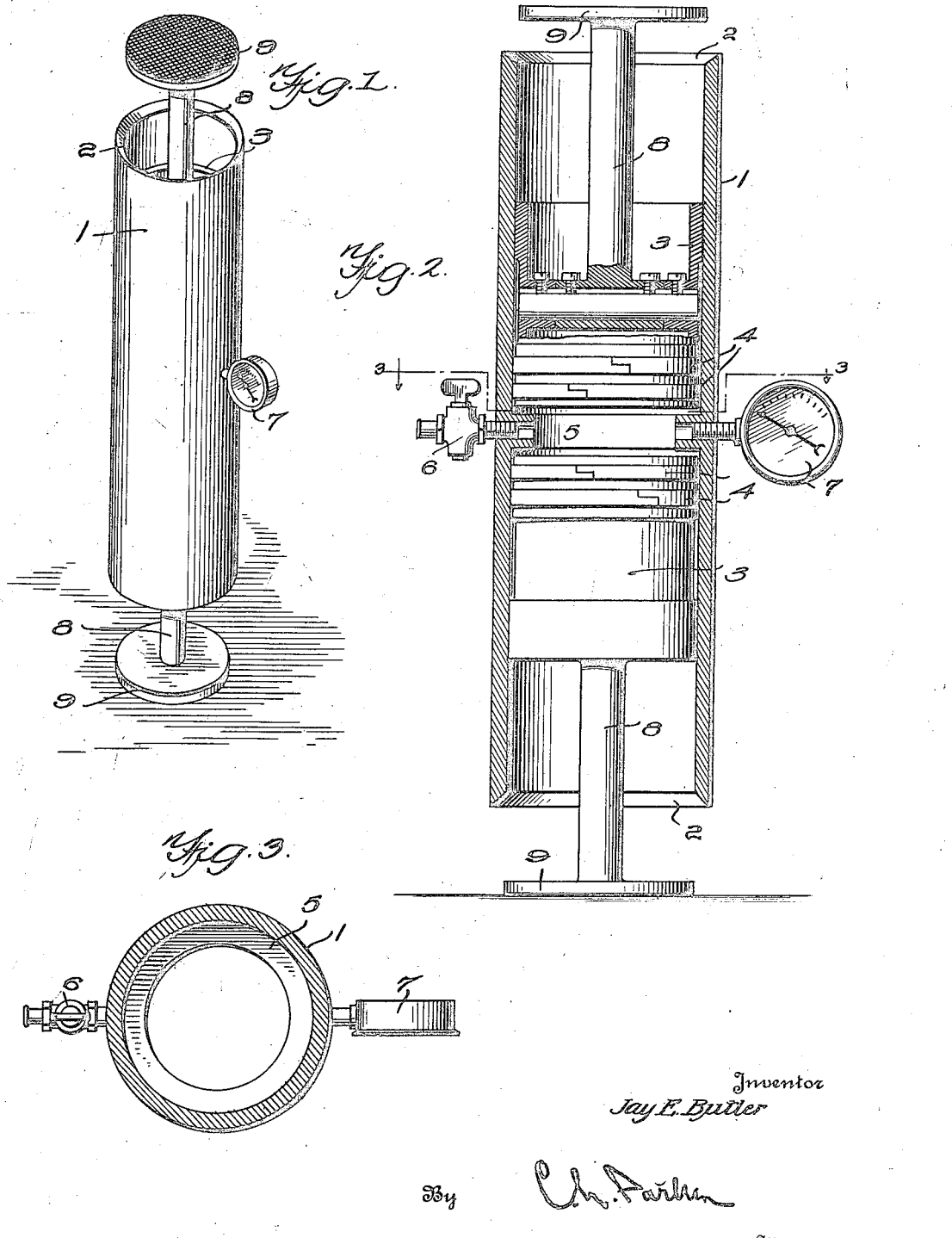

JAY EDGAR BUTLER, OF BALTIMORE, MARYLAND, ASSIGNOR TO VICTOR PISTON RING COMPANY, OF BALTIMORE, MARYLAND, A CORPORATION OF MARYLAND.

APPARATUS FOR TESTING PISTON RINGS.

1,426,711.  Specification of Letters Patent.  Patented Aug. 22, 1922.

Application filed October 27, 1921. Serial No. 510,706.

*To all whom it may concern:*

Be it known that I, JAY EDGAR BUTLER, a citizen of the United States, residing in the city of Baltimore and State of Maryland, have invented certain new and useful Improvements in Apparatus for Testing Piston Rings, of which the following is a specification.

This invention relates to apparatus for testing and demonstrating piston packing rings, and it comprises a cylinder open at each end, a pair of pistons mounted therein, said pistons being provided with grooves, for the reception of rings to be tested, an enlargement formed at the center of the cylinder to limit the inward movement of the pistons, and means for indicating the pressure of the air or gas within the cylinder confined between the pistons.

An object of the invention is the provision of a simple apparatus by which packing rings can be tested and by which the operation or function of piston packing rings can be quickly and clearly demonstrated.

A further object is the provision of a testing apparatus wherein a pair of pistons are employed, and means are provided for limiting the inward movement of the pistons.

In the accompanying drawings, I have shown one embodiment of the invention. In this showing:

Figure 1 is a perspective view of the apparatus,

Figure 2 is a vertical central sectional view, and,

Figure 3 is a horizontal sectional view on line 3—3 of Figure 2.

Referring to the drawings, the reference numeral 1 designates a cylinder having open ends 2. Pistons 3 are mounted in the opposite ends of the cylinder. These pistons are provided with grooves for the reception of packing rings 4 to be tested. The center of the cylinder is provided with an enlargement 5, which limits the inward movement of the pistons and maintains them in spaced relation, forming a chamber at the center of the cylinder. A valve 6 may be tapped through this enlargement to permit escape of the confined gas when desired. A pressure gauge 7 may also be provided to indicate the pressure of the confined gas. The pistons are provided with piston rods 8, having pedals 9 arranged on their outer ends.

In testing and demonstrating a set of piston rings, the pistons are first removed from the cylinders and the rings placed in the grooves. The pistons are then replaced and the apparatus arranged as shown in Figures 1 and 2, with one of the pedals 9 resting on a support. The operator then places his foot on top of the upper pedal 9 and by applying his weight, forces the pistons together and the pressure of the gas contained in the cylinder may be readily determined by the gauge 7. The provision of the enlargement 5 prevents the pistons from traveling inwardly to a point where they meet each other, and thus provides a chamber for the retention of gas or air under pressure.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. An apparatus for testing piston rings comprising a cylinder, having open ends, a pair of pistons mounted therein, said pistons being provided with grooves for the reception of the rings to be tested, piston rods connected to said pistons and projecting toward the respective ends of the cylinder, and pedals formed on the outer ends of said rods.

2. An apparatus for testing piston rings comprising a cylinder having open ends, a pair of pistons mounted in said cylinder, said pistons being provided with grooves for the reception of rings to be tested, piston rods connected to said pistons and projecting toward the respective ends of the cylinder, pedals arranged on the outer ends of said piston rods, and means for limiting the inward movement of the pistons.

3. An apparatus for testing piston rings comprising a cylinder having open ends, a pair of pistons mounted in said cylinder, said pistons being provided with grooves for the reception of rings to be tested, piston rods connected to said pistons and projecting toward the respective ends of the cylinder, pedals arranged on the outer ends of said piston rods, and an enlargement formed in said cylinder intermediate its ends to limit the movement of the pistons toward each other.

4. An apparatus for testing piston rings comprising a cylinder having open ends, a pair of pistons mounted in said cylinder, said pistons being provided with grooves for the reception of rings to be tested, piston rods connected to said pistons and projecting toward the respective ends of the cylinder, pedals arranged on the outer ends of said piston rods, means for limiting the inward movement of the pistons, and means for indicating the pressure of the confined gas.

5. An apparatus for testing piston rings comprising a cylinder having open ends, a pair of pistons mounted therein, said pistons being provided with grooves for the reception of rings to be tested, and piston rods connected to said pistons and projecting beyond the respective ends of the cylinder, said piston rods being provided with enlargements on their outer ends whereby pressure may be applied thereto to move the pistons toward the center of the cylinder.

In testimony whereof I affix my signature in presence of two witnesses.

JAY EDGAR BUTLER.

Witnesses:
FRANCES K. ATHERTON,
E. K. EDWARDS.